Patented Nov. 1, 1932

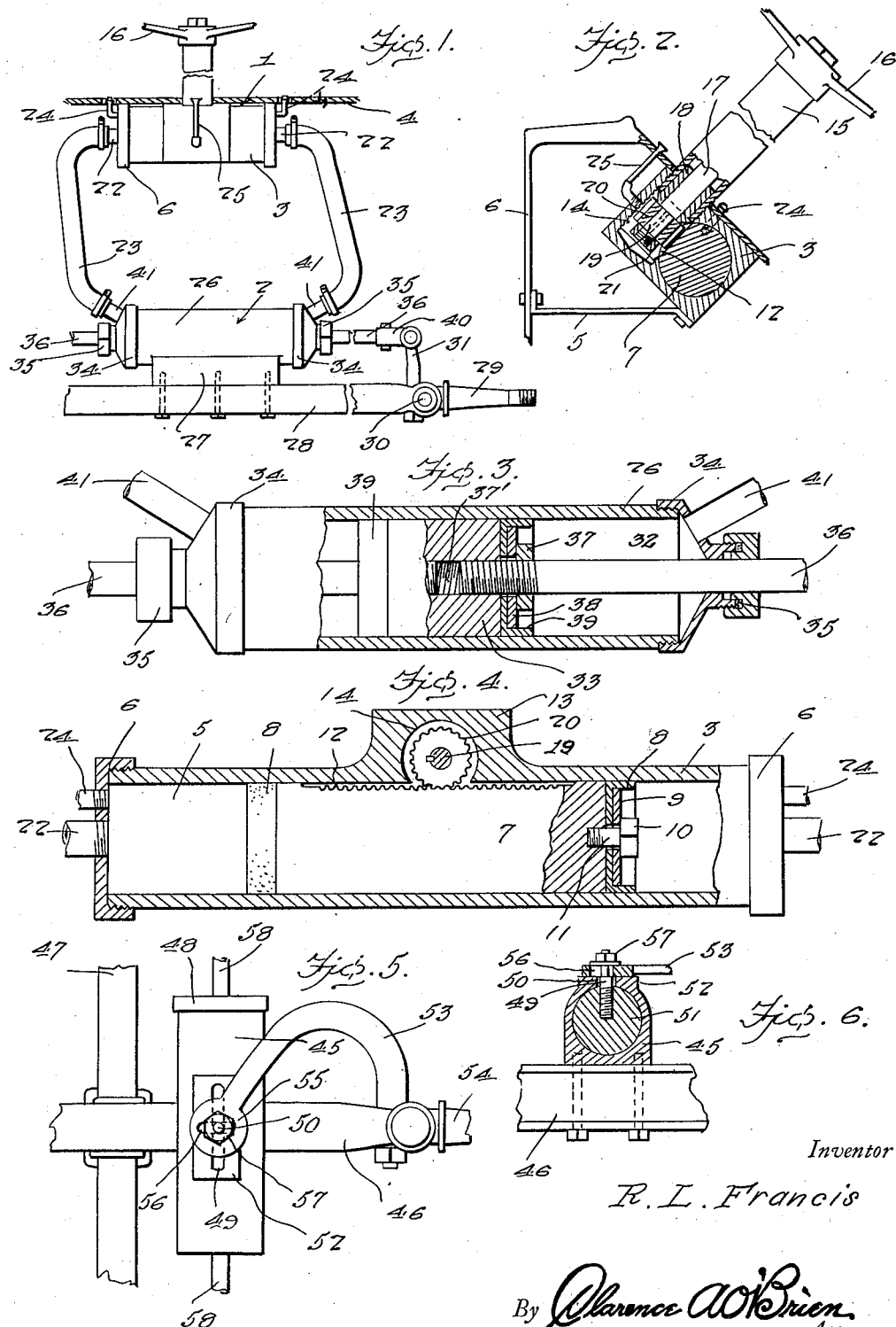

1,885,194

UNITED STATES PATENT OFFICE

ROBERT L. FRANCIS, OF HENDERSONVILLE, NORTH CAROLINA

HYDRAULIC AUTOMOBILE STEERING MECHANISM

Application filed August 8, 1927. Serial No. 211,470.

The present invention relates generally to improvements in hydraulic automobile steering mechanisms such as that forming the subject matter of Letters Patent No. 1,615,075, issued to me on January 18, 1927.

One of the important objects of the invention is to provide a simple and efficient construction mounted in combination with the automobile and manually operable for controlling and operating a suitable contained fluid adapted to transmit the motion to the steering mechanism of the automobile, and operate the same to produce the desired turning movement, the fluid pressure being adapted to absorb the shocks applied to the steering mechanism and equalizing stresses thereon, thereby preventing the application of such stresses to the manually operable mechanism and the steering wheel thereof.

Another very important object of the invention resides in the provision of a hydraulic steering mechanism of this nature having means therein which will effectively and efficiently prevent wobbling of the front wheels as frequently occurs in the ordinary mechanical steering mechanism.

With the above and numerous objects in view as will appear as the description proceeds, the invention resides in certain novel features of construction, and in the combination and arrangement of parts as will be hereinafter more fully described and claimed.

In the drawing:

Figure 1 is a view indicating the improved steering mechanism in assembled relation and showing the associated relation with the front axle of the motor vehicle, Figure 2 is a vertical sectional view through the manually operated mechanism showing the manner of mounting the same on an instrument board of a motor vehicle for proper operation, Figure 3 is a horizontal sectional view through the device for operating the steering gear showing portions in elevation, Figure 4 is a longitudinal sectional view through the plunger and housing of the manually operated controlling mechanism with portions shown in elevation, Figure 5 is a plan view of an axle and spring construction showing the modified form of steering mechanism for the wheel, and Figure 6 is a vertical transverse section through the construction shown in Figure 5.

The improved hydraulic steering mechanism of this invention includes a manually operable control unit 1 which is adapted to control and operate the steering gear operating unit 2 for transmitting motion to and operating the steering gear of the automobile in a desired manner.

The control unit 1 includes a cylinder 3 which is directly mounted on the under side of the instrument board 4 of the automobile and has a suitable brace connection 5' with the dashboard 6. This cylinder block 3 is formed with a cylindrical bore 5 which is closed at the opposite ends of the block by the caps 6. The control piston 7 is reciprocably mounted in the cylindrical bore and has piston cups 8 secured to the opposite ends thereof through the medium of the washers 9 and bolts 10 which are threadedly mounted in threaded recesses 11 in the ends of the piston. One side of the piston 7 is formed with a flattened portion extending longitudinally thereof provided with rack teeth 12. The central portion of the control cylinder block 3 is formed with a laterally extending portion or boss 13 which is formed with a bore 14 having the axis extending laterally to the axis of the cylindrical bore 5 and at one side thereof, said bores communicating and the bore 14 having an open threaded end receiving the steering column 15.

The cylindrical block 3 is mounted on the under side of the dashboard 4 which is formed with an opening in registry with the bore 14 to permit the passage of the steering column 15 therethrough for mounting in the cylinder block in the manner shown in Figure 2. The steering wheel 16 is rotatably mounted on the end of the steering column 15 and is secured to the steering rod 17 having one end rotatable in the bearing sleeve 18 in the lower end of the steering column and provided with a reduced extension 19 on which the pinion 20 is secured intermeshing with the rack teeth 12 on the control piston 7.

A suitable lock nut 21 secures the pinion 20 on the steering rod 17.

The end caps 6 threadedly receive suitable nipples 22 which carry the flexible hose connections 23, for conducting the fluid from the control unit to the steering gear operating unit. Pressure valve fittings 24 are mounted in each end cap and extend laterally from the control unit, projecting through suitable openings in the instrument board 4 to permit the attachment of a pump for supplying oil to the unit under pressure. These valves may be of any desired type known in the art. An oil tube 25 is also connected to the cylinder block 3 for conducting oil into the bore 14 for lubricating the pinion 20.

Steering gear operating unit 2 includes a cylindrical block 26 formed with an extension 27 to provide a seat adapted to fit the axle 28 of the automobile. This is preferably the front axle which pivotally mounts the stub axle 29 on the spindle bolt 30, the stub axle being provided with a steering arm 31 connected with the steering gear and forming part thereof, so that the automobile may be suitably steered by the operation of this gear.

The operated cylinder 26 is formed with a cylindrical bore 32 which receives the operated piston 33 for reciprocating movement therein. The bore 32 extends longitudinally through the body and at each end the cylinder block receives the cap 34 which caps are formed with packing glands 35 for preventing leakage around the operating rods 36 slidably extending through openings in the caps and said glands.

The operating piston 33 is formed with a threaded axial bore 37' which threadedly receives the operating rods 36 in the opposite ends thereof on which are mounted the lock nuts 37 adapted to lock the washers 38 and the piston cups 39 on the ends of the piston body 33. These parts cooperate so that the operating rods 36 are adjustably locked in connection with the piston 33 by the lock nuts 37 which additionally operate in locking the operating rods against movement to rigidly mount the piston cups on the piston 33.

The ends of the operating rods 36 are pivotally connected by the usual fittings 40 with the steering arms 31 of the spindle and stub axle structures. Nipples 41 are threadedly mounted on the sides of the caps and receive the hose connections 23 from the nipples 22.

With this construction, oil is preferably used as the operating fluid and completely fills the hose connections and the cylindrical bores of the control unit and the operating unit between the ends of the piston cups so as to provide two separate bodies of fluid operable in the movement of the control piston 7 to produce a corresponding movement of the operating piston 33. In this way the rotation of the steering wheel will apply a pressure to the fluid in the control unit in the movement of the control piston 7, and correspondingly operate the operating piston 33 for transmitting motion through the operating rods 36 to the steering arms 31, for rotating the stub axles on the main axle 28, and thereby effecting the steering operation of the vehicle equipped therewith.

With this construction, it will be seen that there is a substantially great leverage ratio which permits the resultant easy operation of the steering wheel, at the same time operating the steering mechanism with precision under all conditions of resistance. With a construction of this character, very little effort is required in the operation of the steering mechanism to steer a motor vehicle under the varying conditions of driving.

The operating unit shown in Figures 5 and 6 is constructed and operated so as to eliminate the use of packing glands which are subject to leakage in a device of this character, and include a cylinder block at 45 mounted in any suitable or desired manner on the front axle 46 at the outside of the spring 47 and which has a cylindrical bore open at one end, and closed by the cap 48. The control top portion of the cylinder block 45 is formed with an elongated slot 49 communicating with the cylindrical bore through which extends a pin 50 carried by a piston 51 and adapted for reciprocating movement in the bore. The cylinder block 45 is formed with a boss 52 providing a bearing surface for the free end of the steering arm 53 carried by the spindle and stub axle unit 54.

The arm is provided with an enlarged head 55 slotted transversely as indicated at 56 which slidably receives the pin 50. A lock nut and washer 57 serves to prevent displacement of the operating arm from the pin 50. Suitable nipples 58 are mounted in opposite ends of the unit and communicate with the cylindrical bore at the opposite side of the piston 51 for suitably connecting the control unit with the operating unit through the medium of the hose connections 23. The reciprocation of the piston within the cylinder of the operating unit will produce the necessary operation of the arm 53 for controlling the steering of an automobile in an efficient manner. This construction of the steering gear operating mechanism has more efficient stress equalizing features than the structure shown in Figure 1, in view of the relative angular relation between the direction of application and distribution, in addition to the relation of the mounting of the cylinder on the axle which serves to distribute a large portion of the stress directly to the axle.

It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

In combination with an axle having a wheel carrying spindle pivotally connected to each end thereof, and an arm connected to each spindle for swinging the same, a cylinder connected to each end of the axle, said cylinder having a centrally arranged longitudinally extending slot therein, a piston in each cylinder, a bolt passing through the free end of the arm, the slot and into the piston for connecting the piston to the arm for rocking the arm by the movement of the piston, and means for forcing fluid into either end of each cylinder to move the piston.

In testimony whereof I affix my signature.

ROBERT L. FRANCIS.